United States Patent
Nakamura

(10) Patent No.: US 8,991,453 B2
(45) Date of Patent: Mar. 31, 2015

(54) TIRE FOR MOTORCYCLE

(75) Inventor: Ichizo Nakamura, Sayama (JP)

(73) Assignee: Bridgestone Corporation, Tokyo (JP)

( * ) Notice: Subject to any disclaimer, the term of this patent is extended or adjusted under 35 U.S.C. 154(b) by 890 days.

(21) Appl. No.: 13/140,545

(22) PCT Filed: Dec. 18, 2009

(86) PCT No.: PCT/JP2009/007010
§ 371 (c)(1),
(2), (4) Date: Sep. 6, 2011

(87) PCT Pub. No.: WO2010/070921
PCT Pub. Date: Jun. 24, 2010

(65) Prior Publication Data
US 2011/0308681 A1 Dec. 22, 2011

(30) Foreign Application Priority Data
Dec. 18, 2008 (JP) ................. 2008-322067

(51) Int. Cl.
*B60C 11/11* (2006.01)
*B60C 11/13* (2006.01)
*B60C 11/03* (2006.01)

(52) U.S. Cl.
CPC ............... *B60C 11/11* (2013.01); *B60C 11/032* (2013.04); *B60C 11/1376* (2013.04); *B60C 2200/10* (2013.04); *B60C 2200/14* (2013.04); *B60C 2011/1338* (2013.04); *Y10S 152/902* (2013.01)
USPC ................. 152/209.21; 152/153; 152/209.11; 152/209.12; 152/902

(58) Field of Classification Search
CPC ........ B60C 23/00; B60C 23/18; B60C 23/19; B60C 11/03; B60C 11/11; B60C 11/0311; B60C 11/0316; B60C 11/1369; B60C 11/1376; B60C 2011/1338; B60C 2011/0037; B60C 2011/1307; B60C 2011/1353; B60C 2011/1361; B60C 2200/10; B60C 2200/14
USPC .................. 152/209.18, 153, 209.11, 209.12, 152/209.15, 209.19, 209.21, 209.22, 902, 152/904, DIG. 1, DIG. 4
See application file for complete search history.

(56) References Cited

U.S. PATENT DOCUMENTS 1,223,049 A * 4/1917 Hicks ............................ 152/320
4,881,586 A * 11/1989 Shinomiya ............... 152/209.12

(Continued)

FOREIGN PATENT DOCUMENTS

EP 1 619 050 A1 1/2006
JP 55-136608 A 10/1980

(Continued)

OTHER PUBLICATIONS

Japanese Office Action issued in Japanese Application No. 2008-322067 dated Feb. 5, 2013.

(Continued)

*Primary Examiner* — Eric Hug
(74) *Attorney, Agent, or Firm* — Sughrue Mion, PLLC

(57) ABSTRACT

A tire (1) for a motorcycle has: a groove portion (10) formed at a tread; and a block-shaped land portion (100) protrusive from the groove portion (10) toward an outside in a tire radial direction (TD). The land portion (100) has a plate-shaped small piece portion (107). Since an area with which the running wind comes into contact increases due to the small piece portion (107), the periphery of the groove portion (10) or the land portion (100) can be effectively thermally radiated. Thus, a temperature of the land portion (100) can be reduced, and even if the automatic motorcycle runs on the hard road surface over a predetermined period of time or more, it is possible to effectively restrain the lowering of required performance such as gripping force, feeling of grounding, and steering stability, which is exerted by the lowering of the rigidity of the land portion.

9 Claims, 7 Drawing Sheets

(56) References Cited

U.S. PATENT DOCUMENTS

| | | | | |
|---|---|---|---|---|
| 5,147,478 | A | * | 9/1992 | Nock et al. ............... 152/209.21 |
| 2007/0062626 | A1 | * | 3/2007 | Oyama ................... 152/209.19 |
| 2009/0145529 | A1 | * | 6/2009 | Miyazaki ................ 152/209.21 |
| 2010/0236678 | A1 | | 9/2010 | Sueishi |

FOREIGN PATENT DOCUMENTS

| | | | |
|---|---|---|---|
| JP | 62-106805 U | | 7/1987 |
| JP | 2-175305 A | | 7/1990 |
| JP | 3-276802 | * | 12/1991 |
| JP | 7-223410 | * | 8/1995 |
| JP | 2004-306843 A | | 11/2004 |
| JP | 2009-67245 A | | 4/2009 |
| WO | 03/013883 A1 | | 2/2003 |
| WO | 2009/034807 A1 | | 3/2009 |
| WO | WO 2009/080125 | * | 7/2009 |

OTHER PUBLICATIONS

Extended European Search Report, dated Jan. 28, 2014, issued in counterpart European Patent Application No. 09833228.1.

* cited by examiner

TIRE FOR MOTORCYCLE

TECHNICAL FIELD

The present invention relates to a tire for a motorcycle, which is provided with: a groove portion which is formed at a tread; and a block-shaped land portion which is protrusive from the groove portion toward the outside in a radial direction of the tire.

BACKGROUND ART

Conventionally, a tire for a motorcycle, which is employed in an automobile motorcycle which is oriented for motocross or enduro events specialized for a rough ground, is required to have its high applicability to an extent such that the tire is adaptable to road surfaces of a variety of states from a hard road surface such as a dry unpaved road surface to a soft road surface such as a muddy ground. In such a tire for a motorcycle, in order to enhance a gripping force (traction performance), a method of generally providing a plurality of block-shaped land portions at a tread to thereby cut the land portions into a road surface is widely employed.

In addition, in consideration of the fact that characteristics to be imparted to a land portion are different depending on a hard road surface and a soft road surface and the fact that a shoulder region of a tread is mainly employed at the time of cornering on a hard road surface, a method of making disposition patterns of land portions different from each other depending on a center region and the shoulder region of the tread is known (refer to Patent Document 1). According to such a method, the applicability of the tire for a motor cycle to a road surface can be improved.

Further, in a case where the tire for a motorcycle rolls on a hard road surface, since it is difficult to cut land portions into the road surface, a method of increasing an area for grounding onto the road surface by employing a soft rubber in the land portions is known as well. According to such a tire for a motorcycle, even at the time of rolling on the hard road surface, it is possible to ensure required performance such as a griping force, feeling of grounding, and steering stability.

PRIOR ART LITERATURE

Patent Documents

Patent Document 1: Japanese Patent Application Laid-open No. 2004-306843 (Page 4, FIG. 1)

SUMMARY OF THE INVENTION

However, the conventional tire for a motorcycle described above has entailed the following problem. That is, if a soft rubber is employed for a land portion, a deformation quantity of the land portion increases on a hard road surface. Thus, if an automatic motorcycle runs on the hard road surface over a predetermined period of time or more, a temperature of the land portion significantly increases. If the temperature of the land portion increases, rigidity of the land portion lowers while the automatic motorcycle runs; and therefore, there has been a problem that the gripping force, the feeling of grounding, and the steering stability or the like lower.

Therefore, it is an object of the present invention to provide a tire for a motorcycle, which is capable of effectively restraining lowering of required performance, such as the gripping force, the feeling of grounding, and the steering stability, which is exerted by lowering of the rigidity of a land portion, even if an automatic motorcycle runs on a hard road surface over a predetermined period of time or more.

To solve the above problem, the present invention has following features. Firstly, a first feature of the present invention is summarized as a tire for a motorcycle (tire for a motorcycle 1), including: a groove portion (groove portion 10) formed at a tread; and a block-shaped land portion (land portion 100) protrusive from the groove portion toward an outside in a tire radial direction, wherein the land portion has a plate-shaped small piece portion (for example, small piece portion 107); and the small piece portion is provided at a position which includes at least a boundary (boundary 90) between the land portion and the groove portion.

According to such characteristics, a flat plate-shaped small piece portion is provided at a position which includes at least a boundary between a land portion and a groove portion. Accordingly, a running wind which has occurred due to the running of an automatic motorcycle hits the small piece portion and then a turbulent flow occurs at the small piece portion. The periphery of the groove portion or land portion can be thermally radiated effectively due to the turbulent flow that occurred. In addition, an area with which the running wind comes into contact increases due to the small piece portion while the automatic motorcycle runs, and the lowering of rigidity of the the groove portion or land portion can be restrained. Thus, it can reduce the temperature of the land portion and restrain rigidity lowering of the land portion during the automatic motorcycle runs. In this manner, even in a case where a soft rubber is employed for a lamp portion, the deformation quantity of the land portion on the hard road surface can be reduced. Therefore, even if the automatic motorcycle runs on the hard road surface over a predetermined time or more, it is possible to effectively restrain the lowering of the required performance such as the gripping force, the feeling of grounding, and the steering stability, which is exerted by lowering of the rigidity of the land portion.

A second feature of the present invention according to the first feature is summarized as the land portion having at least one pair of the small piece portions.

A third feature of the present invention according to the second feature is summarized as one pair of the small piece portions provided at positions which are opposite to each other, with reference to a center of the land portion, seen in a plan view of the tire for a motorcycle.

A fourth feature of the present invention according to the first to third features is summarized as a longitudinal direction of the small piece portions taken along a tread widthwise direction.

A fifth feature of the present invention according to the fourth feature is summarized as the small piece portion having; an upper edge (for example, upper edge 71) extensive from a side wall of the land portion along the tread widthwise direction in a cross section taken along the tread widthwise direction and the tire radial direction of the tire for a motorcycle; and a side edge (for example, side edge 75) extensive from an end part (for example, end part 73) of the upper edge that is positioned at a far side from the side wall (side wall 100A) of the land portion toward the groove portion.

A sixth feature of the present invention according to the first to fifth features is summarized as the longitudinal direction of the small piece portions taken along a tire circumferential direction.

A seventh feature of the present invention according to the sixth feature is summarized as the small piece portion having; an upper edge which is extensive from the side wall of the land portion along the tire circumferential direction in a cross section taken along the tire circumferential direction and the tire radial direction of the tire for a motorcycle; and a side edge which is extensive from the end part of the upper edge that is positioned from a far side from the side wall of the land portion toward the groove portion.

An eighth feature of the present invention according to the first to seventh features is summarized as a height from the groove portion of the small piece portion being 10% to 40% of a height from the groove portion of the land portion.

An ninth feature of the present invention according to the first to eighth features is summarized as a maximum length of the small piece portion taken along the tire circumferential direction or the tread widthwise direction being 2 mm to 12 mm.

An ninth feature of the present invention according to the first to eighth features is summarized as a thickness of the small piece portion being 1 mm to 4 mm.

According to the present invention, provided is a tire for a motorcycle, which is capable of effectively restraining lowering of required performance, such as the gripping force, the feeling of grounding, and the steering stability, which is exerted by lowering of the rigidity of a land portion, even if an automatic motorcycle runs on a hard road surface over a predetermined period of time or more

EMBODIMENTS FOR CARRYING OUT THE INVENTION

Figure 1:
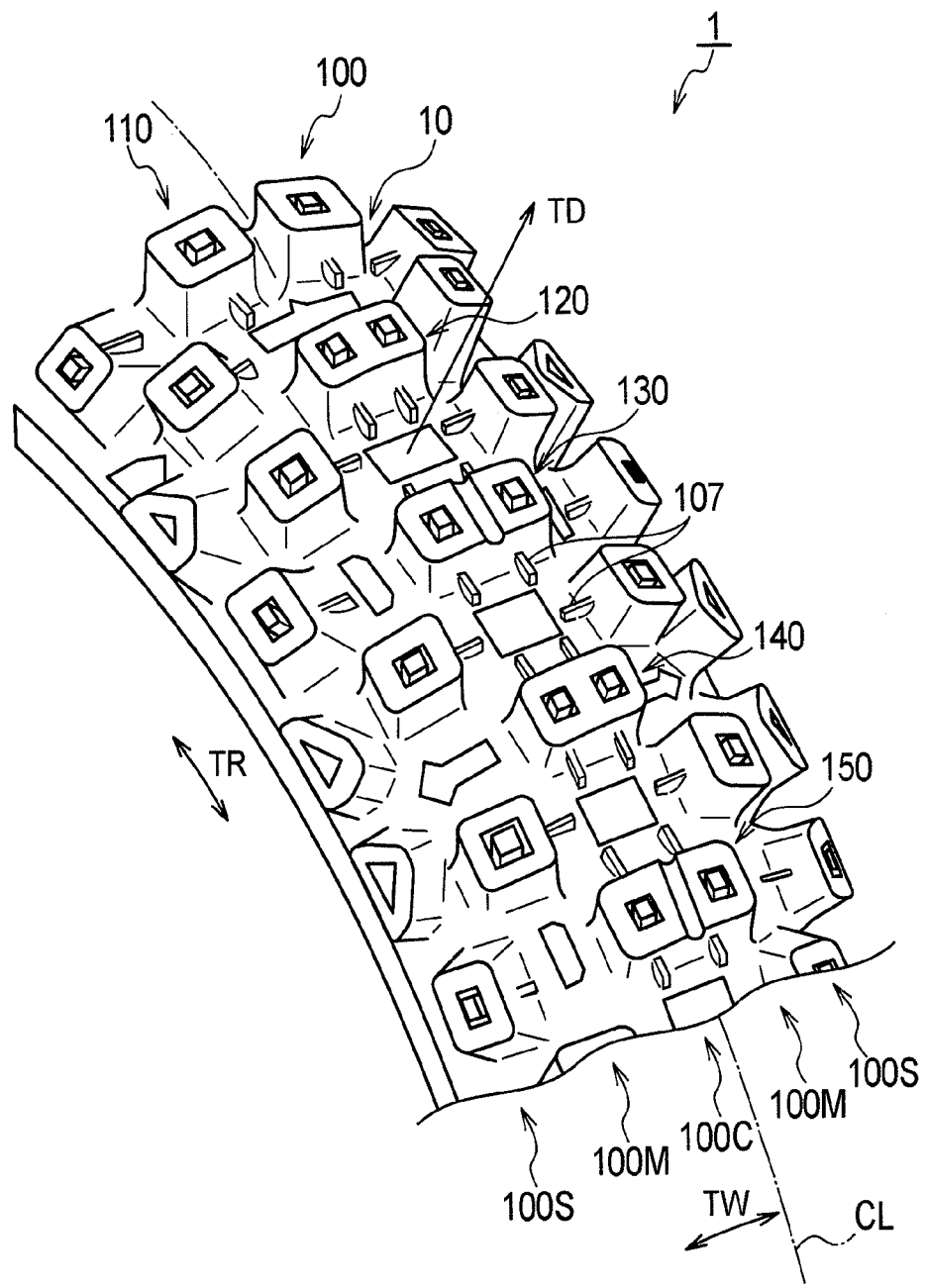
FIG. 1 is a perspective view showing a tire 1 for an automatic motorcycle, according to the embodiment.

Next, embodiments of a tire for an automatic motorcycle, according to the present invention, will be described with reference to the drawings. Specifically, descriptions will be furnished with respect to (1) Structure of Tire for Automatic Motorcycle, (2) Structure of Small Piece Portion, (3) Comparative Evaluation, (4) Functions and Advantageous Effects, (5) Exemplary Modifications, and (6) Other Embodiments.

In the description of drawings that follows, the same or similar constituent elements are designated by the same or similar reference numerals. However, it should be kept in mind that the drawings are merely schematic and the rates of dimensions each are different from an actual one.

Therefore, specific dimensions or the like should be determined in consideration of the following explanation. In addition, it is a matter of course that portions which are different from each other in terms of dimensions or rates are included in the drawings as well.

(1) Structure of Tire for Automatic Motorcycle

Figure 2:
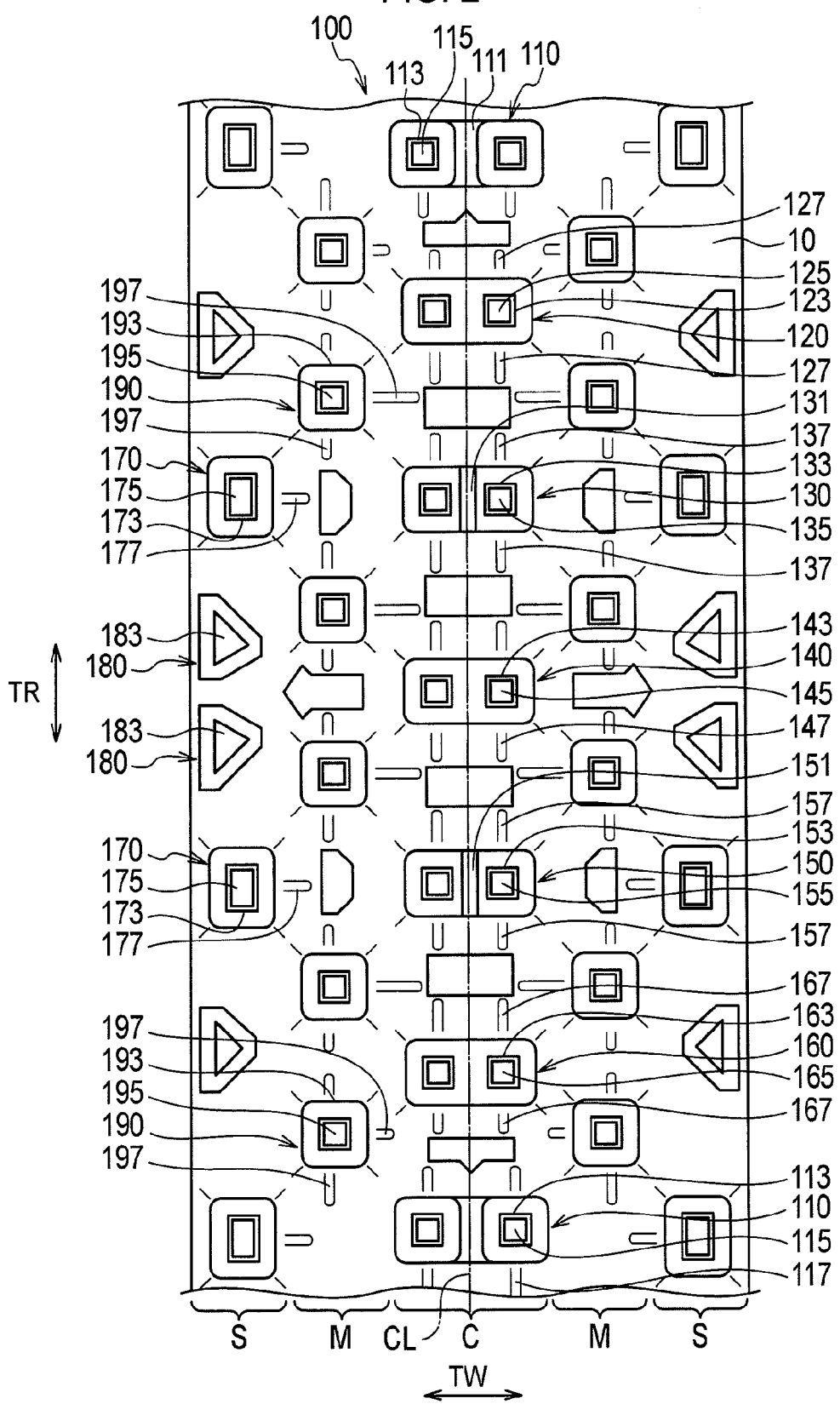
FIG. 2 is an exploded view showing a part of a tread of the tire 1 for an automatic motorcycle, according to the embodiment.
Figure 3:
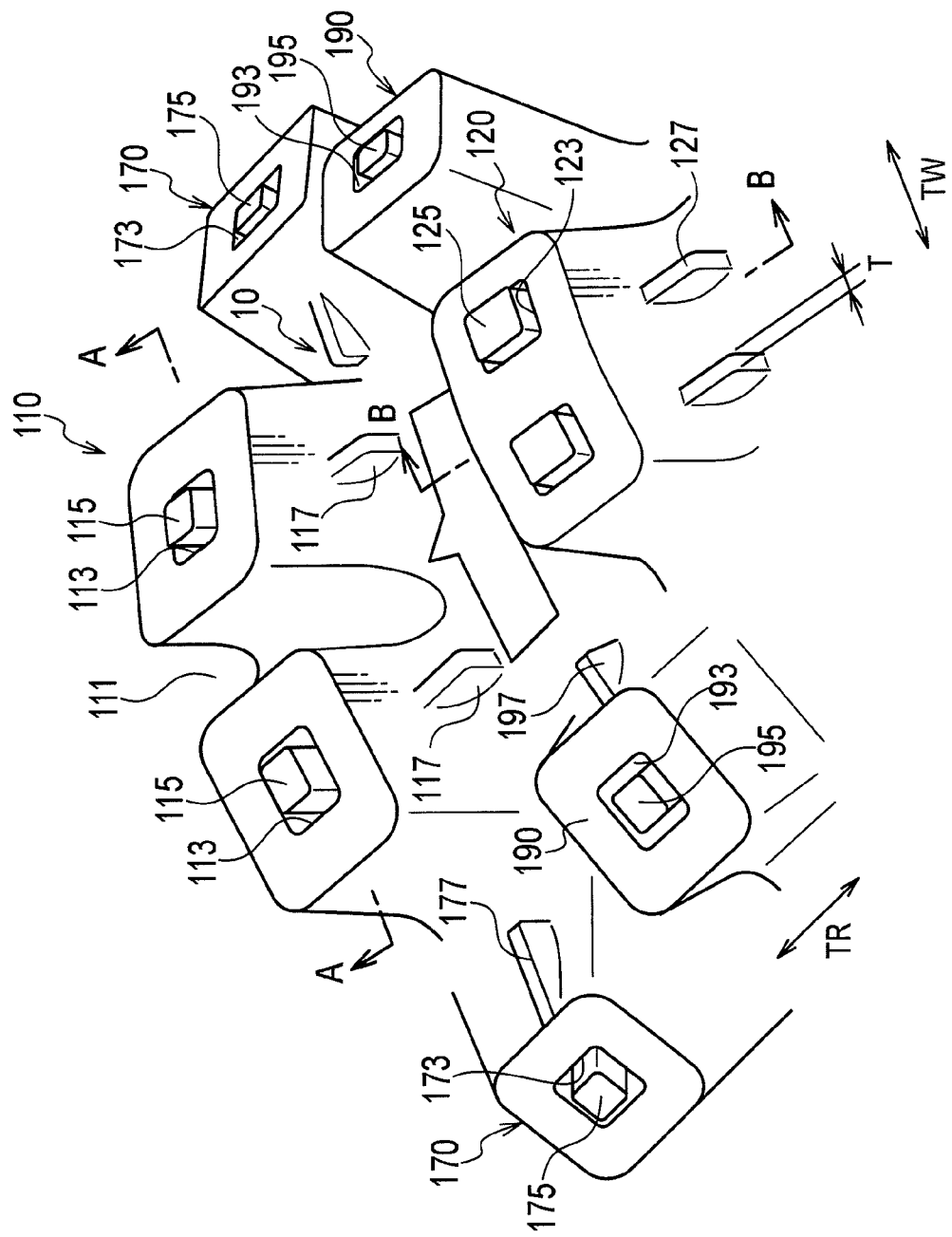
FIG. 3 is an enlarged perspective view showing a part of the tire 1 for an automatic motorcycle, according to the embodiment.
Figure 4:
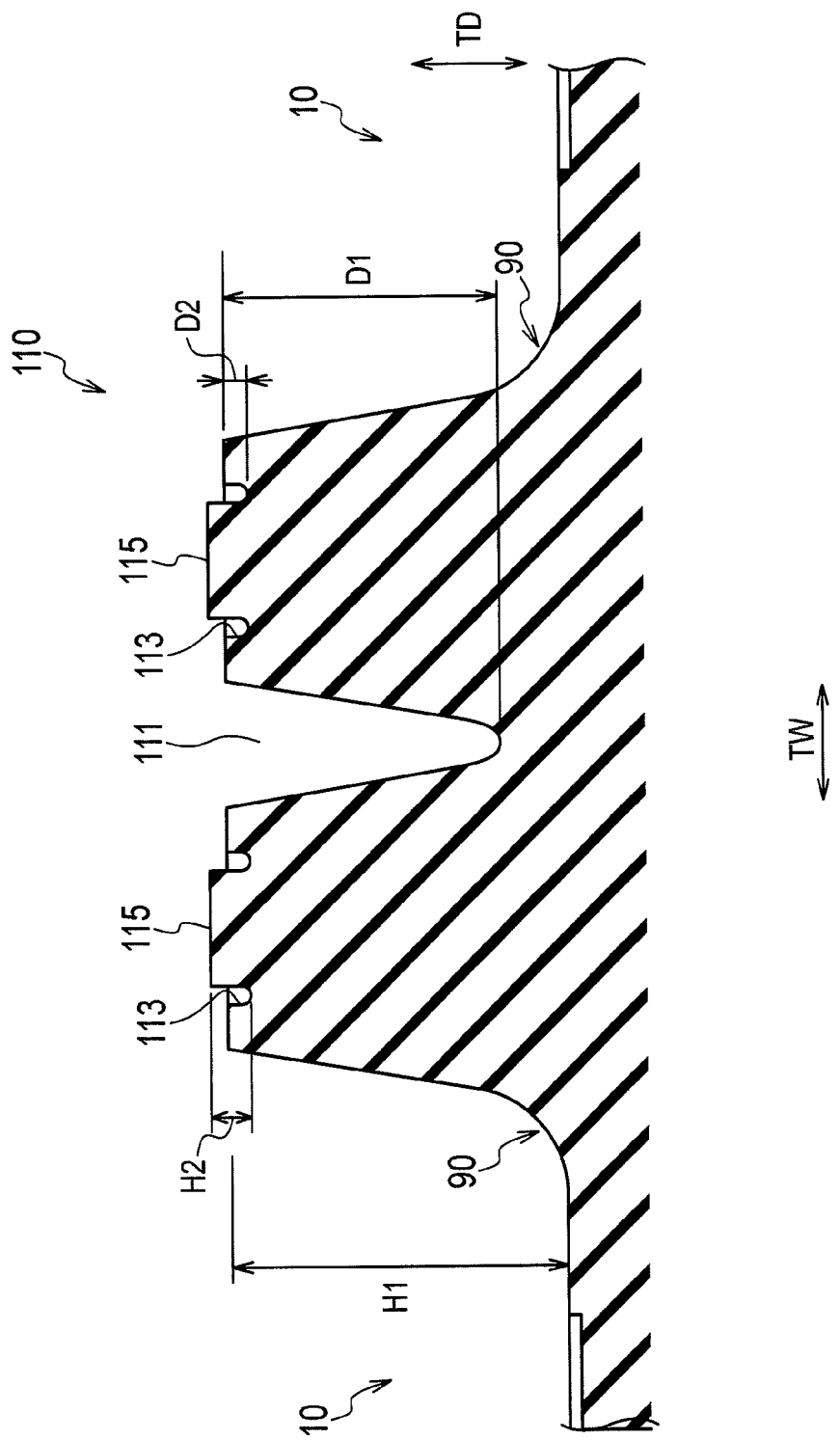
FIG. 4 is a partially cross-sectional view (a cross-sectional view taken along the line A-A of FIG. 3) of the tire 1 for an automatic motorcycle, according to the embodiment.
Figure 5:
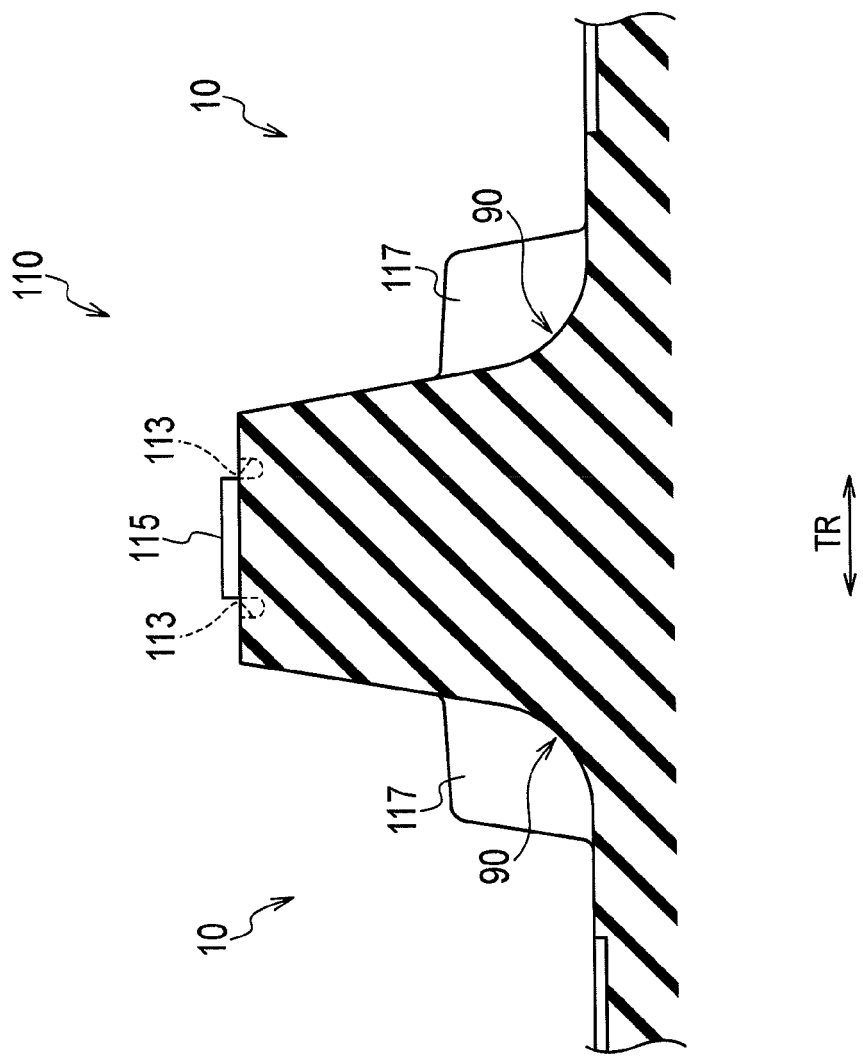
FIG. 5 is a partially cross-sectional view (a cross-sectional view taken along the line B-B of FIG. 3) of the tire 1 for an automatic motorcycle, according to the embodiment.

First, a structure of a tire 1 for an automatic motorcycle, according to the embodiment, will be described with reference to the drawings. FIG. 1 is a perspective view showing the tire 1 for an automatic motorcycle, according to the embodiment. FIG. 2 is an exploded view showing a part of a tread of the tire 1 for an automatic motorcycle, according to the embodiment. FIG. 3 is an enlarged perspective view showing a part of the tire 1 for an automatic motorcycle, according to the embodiment. FIG. 4 is a partially cross-sectional view (a cross-sectional view taken along the line A-A of FIG. 3) of the tire 1 for an automatic motorcycle, according to the embodiment. FIG. 5 is a partially cross-sectional view (a cross-sectional view taken along the line B-B of FIG. 3) of the tire 1 for an automatic motorcycle, according to the embodiment.

As shown in FIG. 1 and FIG. 2, the tire 1 for an automatic motorcycle is provided with: a groove portion 10 which is formed at a tread; and a block-shaped land portion 100 which is protrusive from the groove portion 10 toward the outside of a tire radial direction TD.

The land portion 100 is comprised of: a plurality of center land portions 100C which are positioned at a tread center part C which includes a tire equator line CL; a plurality of end part land portions 100S which are positioned at a tread end part S which includes a tread grounding end; and a plurality of intermediate land portions 100M which are positioned at a tread intermediate land portion 100M between the tread center part C and the tread end part S.

The land portion 100 has at least one pair of flat plate-shaped small piece portions 107 (so called fins). The pair of small piece portions 107 are provided at positions which include at least a boundary 90 between the groove portion 10 and the land portion 100. A structure of the small piece portion 107 will be described later.

(1-1) Center Land portion

Center land portions 100C are arranged at predetermined intervals along the tire circumferential direction TR to thereby form a center block row. The center block row is formed by a first center land portion 110, a second center land portion 120, a third center land portion 130, a fourth center land portion 140, a fifth center land portion 150, and a sixth center land portion 160. The first center land portion 110, the second center land portion 120, the third center land portion 130, the fourth center land portion 140, and the fifth center land portion 150 are repeatedly arranged along the tire peripheral direction TR.

(1-1-1) First Center Land portion

A first center land portion 110 is formed in a rectangular shape taken along a tread widthwise direction TW. The first center land portion 110 has a shallow groove 111, a recessed portion 113, a protrusion 115, and a small piece portion 117.

The shallow groove 111 extends on the tire equator line CL. As shown in FIG. 3 to FIG. 5, a depth D1 of the shallow groove 111 is smaller than a height H1 from the groove portion 10 of the first center land portion 110. The recessed portion 113 is formed in a substantial square shape as seen in a tread plan view (refer to FIG. 2) at each side in the tread widthwise direction TW of the shallow groove 111. A depth D2 of the recessed portion 113 is smaller than the depth D1 of the shallow groove 111.

A protrusion 115 is formed in a substantial square shape at a center bottom part of the recessed portion 113. A top part (a stepped surface) of the protrusion 115 is formed in a substantially parallel to a stepped surface of the first center land portion 110. It is preferable that a height H2 of the protrusion 115 is +2 mm relative to the depth D2 of the recessed portion 113.

A gap is formed between a side wall of the protrusion 115 and a side wall of the abovementioned recessed portion 113. It is preferable that the space is set to an extent such that, when the first center land portion 110 comes into contact with a road surface, the side wall of the protrusion 115 and the side wall of the recessed portion 113 do not come into contact with each other.

The small piece portions 5117 are provided at positions which are opposite to each other in the tire circumferential direction TR with reference to a center of the first center land portion 110 as seen in a tread plan view (refer to FIG. 2) (namely, on faces which are opposite to each other). The small piece portions 117 are provided symmetrically in the tire circumferential direction TR with reference to the center of the first center land portion 110. The small piece portion 117 is taken along the tire circumferential direction TR.

(1-1-2) Second Center Land portion

A second center land portion 120 is formed in a rectangular shape taken along the tread widthwise direction TW, as is the case with the first center land portion 110. In addition, the second center land portion 120 has a recessed portion 123, a protrusion 125, and a small piece portion 127. That is, a groove which corresponds to the abovementioned shallow groove 111 is not formed at the second center land portion 120.

Since structures of the recessed portion 123, the protrusion 125, and the small piece portion 127 are similar to those of the recessed portion 113, the protrusion 115, and the small piece portion 117 in the abovementioned first center land portion 110, a duplicate description is omitted.

(1-1-3) Third Center Land portion

A third center land portion 130 is formed in a rectangular shape taken along the tread widthwise direction TW, as is the case with the first center land portion 110 and the second center land portion 120. In addition, the third center land portion 130 has a shallow groove 131, a recessed portion 133, a protrusion 135, and a small piece portion 137.

The shallow groove 131 extends on the tire equator line CL. The shallow groove 131 is smaller in depth than a width of the shallow groove 111 provided in the tread widthwise direction TW.

Since structures of the recessed portion 133, the protrusion 135, and the small piece portion 137 are identical to those of the recessed portion 113, the protrusion 115, and the small piece portion 117 in the abovementioned first center land portion 110 or those of the recessed portion 123, the protrusion 125, and the small piece portion 127 in the abovementioned second center land portion 120, a duplicate description is omitted.

(1-1-4) Fourth Center Land portion

A fourth center land portion 140 is formed in a rectangular shape taken along the tread widthwise direction TW, as is the case with the second center land portion 120. In addition, the fourth center land portion 140 has a recessed portion 143, a protrusion 145, and a small piece portion 147.

Since structures of the recessed portion 143, the protrusion 145, and the small piece portion 147 are identical to those of the recessed portion 123, the protrusion 125, and the small piece portion 127 in the abovementioned second center land portion 120, a duplicate description is omitted.

(1-1-5) Fifth Center Land portion

A fifth center land portion 150 is formed in a rectangular shape taken along the tread widthwise direction TW, as is the case with the third center land portion 130. In addition, the fifth center land portion 150 has a shallow groove 151, a recessed portion 153, a protrusion 155, and a small piece 157.

Since structures of the shallow groove 151, the recessed portion 153, and the protrusion 155, and the small piece portion 157 are identical to those of the shallow groove 131, the recessed portion 133, the protrusion 135, and the small piece portion 137 in the abovementioned third center land portion 130, a duplicate description is omitted.

(1-1-6) Sixth Center Land portion

A sixth center land portion 160 is formed in a rectangular shape taken along the tread widthwise direction TW, as is the case with the second center land portion 120. In addition, the sixth center land portion 160 has a recessed portion 163, a protrusion 165, and a small piece portion 167.

Since structures of the recessed portion 163, the protrusion 165, and the small piece portion 167 are identical to those of the recessed portion 123, the protrusion 125, and the small piece portion 127 in the abovementioned second center land portion 120, a duplicate description is omitted.

(1-2) End Part Land portion

End part land portions 100S are arranged at predetermined intervals along the tire circumferential direction TR to thereby form an end part block row. The end part land portion 100S is formed by a first end part land portion 170 and multiple (two) second end part land portions 180 which are positioned outside of the tread widthwise direction TW more than the first end part land portion 170. The first end part land portion 170 and the multiple second end part land portions 180 are repeatedly arranged along the tire circumferential direction TR.

(1-2-1) First End Part Land portion

A first end part land portion 170 is formed in a substantial square shape as seen in a tread plan view (refer to FIG. 2). In addition, the first end part land portion 170 has a recessed portion 173, a protrusion 175, and a small piece portion 177.

The small piece portions 177 are provided at positions which are opposite to each other in the tread widthwise direction TW with reference to the center of the end part land portion 100S (that is, faces which are opposite to each other). The small piece portions 177 are provided symmetrically in the tread widthwise direction TW with reference to the center of the first end part land portion 170. The small piece portions 177 are taken along the tread widthwise direction TW.

Since structures of the recessed portion 173, the protrusion 175, and the small piece portion 177 are identical to those of the recessed portion, the protrusion, and the small piece portion in the abovementioned center land portion 100C, a duplicate description is omitted.

(1-2-2) Second End Part Land portion

A second end part land portion 180 is formed in a substantially pentagonal shape as seen in a tread plan view (refer to FIG. 2). In addition, the second end part land portion 180 has at least a recessed portion 183. That is, a portion corresponding to the small piece portion in the abovementioned center land portion 100C is not formed at the second end side land portion 180.

The recessed portion 183 is formed in the substantially pentagonal shape as seen in the tread plan view. A depth of the recessed portion 183 is identical to that of the recessed portion in the abovementioned center land portion 100C.

The second end part land portion 180 does not always need to have only the recessed portion 183, and for example, a protrusion or a small piece portion may be provided, as is the case with the first end part land portion 170.

(1-3) Intermediate Land Portion

Intermediate land portions 100M are arranged at predetermined intervals along the tire circumferential direction TR to thereby form an intermediate block row. An intermediate land portion 100M is formed by a plurality of intermediate land portions 190. The intermediate land portions 190 are repeatedly arranged along the tire circumferential direction TR. The intermediate land portions 190 is formed in a substantial square shape as seen in a tread plan view (refer to FIG. 2). The intermediate land portions 190 has a recessed portion 193, a protrusion 195, and a small piece portion 197.

The small piece portions 197 are provided at positions which are opposite to each other in the tire circumferential direction TR and the tread widthwise direction TW with reference to the center of the intermediate land portion 100M (that is, faces which are opposite to each other) as seen in a tread plan view (refer to FIG. 2). The small piece portions 197 are provided symmetrically in the tire circumferential direction TR and the tread widthwise direction TW with reference to the center of the intermediate land portion 100M. The small piece portions 197 are taken along the tire circumferential direction TR and the tread widthwise direction TW.

Since structures of the recessed portion 193, the protrusion 195, and the small piece portion 197 are identical to those of the recessed portion, the protrusion, and the small piece portion in the abovementioned center land portion 100C, a duplicate description is omitted.

(2) Structure of Small Piece Portion

Figure 6:
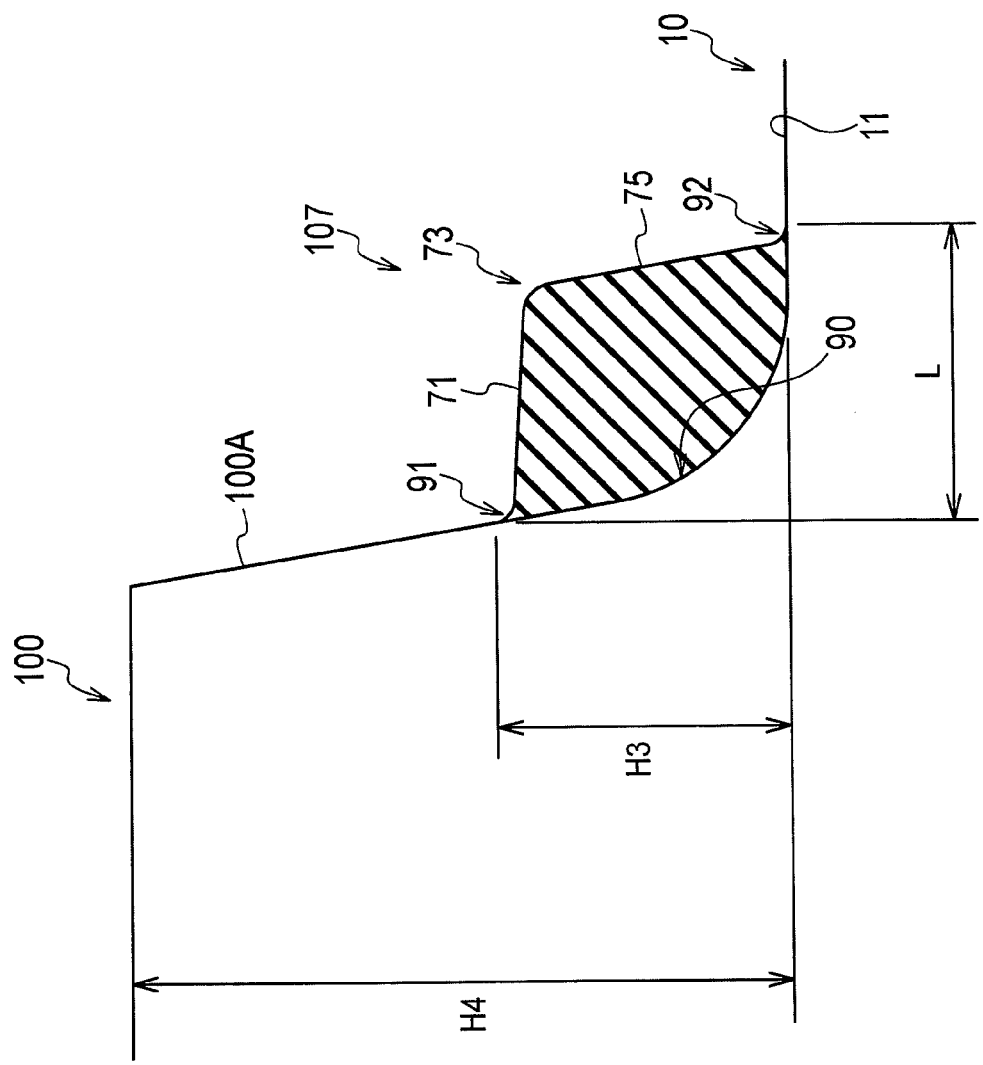
FIG. 6 is a cross-sectional view showing a small piece portion 107 according to the embodiment.

Next, a structure of the abovementioned small piece portion 107 will be described with reference to FIG. 3 to FIG. 6. FIG. 6 is an enlarged cross-sectional view showing a small piece portion 107 of a tire 1 for an automatic motorcycle, according to the embodiment. The small piece portion 107 has the structure similar to those of the abovementioned small pieces 117, 127, 137, 147, 157, 167, 177, and 197.

As shown in FIG. 3 to FIG. 6, the small piece portion 107, as described above, is formed in a planer shape, and is provided at a position including at least the boundary 90 between the groove portion 10 and the land portion 100. The boundary 90 between the groove portion 10 and the land portion 100 is formed in a curved shape (an R-shape).

The small piece portion 107 has: an upper edge 71 which is extensive from a side wall 100A of the land portion 100 along a tread widthwise direction TW; and a side edge 75 which is extensive from an end part 73 of the upper edge 71, which is positioned at a far side from the side wall 100A of the land portion 100, toward the groove portion 10, in a cross section taken along the tread widthwise direction TW and the tire diameter direction TD of the tire 1 for an automatic motorcycle or in a cross section taken along the tire circumferential direction TR and the tire radial direction TD (refer to FIG. 3 to FIG. 5).

The upper edge 71 and the side edge 75 are formed in a linear shape. A boundary 91 between the upper edge 71 and the side wall 100A of the land portion 100 and a boundary 92 between the side wall 75 and the groove portion 10 are formed in a curved shape (an R-shape) and are continuous to each other. In addition, a boundary between the upper edge 71 and the side edge 75, i.e., the end part 73 of the upper edge 71 is formed in the curved shape (an R-shape).

A height H3 from the groove portion 10 up to the upper edge 71 of the small piece portion 107 is 10% to 40% of a height H4 from the groove portion 10 of the land portion 100 (for example, a height H1 from the groove portion 10 of the first center land portion 110).

A maximum length L of the small piece portion 107 taken along the tire circumferential direction TR or the tread widthwise direction TW is 2 mm to 12 mm. In addition, a thickness T of the small piece portion 107 is 1 mm to 4 mm (refer toe FIG. 3).

(3) Comparative Evaluation

Next, in order to further clarify advantageous effects of the present invention, a description will be furnished with respect to comparative evaluations which have been made by employing tires for an automatic motorcycle according to Comparative Examples and Working Examples. Specifically, descriptions will be furnished with respect to (3-1) Structure of Tires for an automatic motorcycle and (3-2) Evaluation Result. It should be kept in mind that the present invention is not limited by these examples.

(3-1) Structure of Tires for Automatic Motorcycle

First, tires for an automatic motorcycle, according to Comparative Examples and Examples will be described with reference to Table 1.

TABLE 1

|  | Comparative Example 1 | Comparative Example 2 | Example 1 | Example 2 |
|---|---|---|---|---|
| Tire size (tire diameter in inches) | 120/80 (19 inches) | | | |
| Rim size | 2.15 × 19 | | | |
| Negative rate (rate between groove portion and land portion) | 80% | | | |
| Height of land portion | 15.5 mm | | | |
| Load/internal pressure condition | 250 kg/80 kPa | | | |
| Tire structures | Bias structure | Radial structure | Bias structure | Radial structure |
| Presence or absence of small piece portion | Absent | Absent | Present | Present |

Bias structure –> Nylon 2P (cord angle: 30 degrees) + Nylon cap
Radial structure –> Nylon 1P (cord angle: 90 degrees) + Kepler mono-spiral belt (MSB)

As shown in Table 1, small piece portions 107 which were described in the foregoing embodiment are not provided at the tires for an automatic motorcycle, according to Comparative Examples 1 and 2. On the other hand, the small piece portions 107 described in the foregoing embodiment are provided at the tires for an automatic motorcycle, according to Examples 1 and 2.

(3-2) Evaluation Result

Next, with reference to Table 2, a description will be furnished with respect to an evaluation result obtained by employing the abovementioned tires for an automatic motorcycle, according to Comparative Examples 1 and 2 and Examples 1 and 2.

TABLE 2

|  | Comparative Example 1 | Comparative Example 2 | Example 1 | Example 2 |
|---|---|---|---|---|
| Feeling of Grip | 5 | 5 | 5 | 5 |
| Feeling of Grounding | 5 | 5 | 5 | 5 |
| Feeling of Rigidity | 5 | 5 | 5 | 5 |
| Steering stability at the time of slide running | 5 | 5 | 5 | 5 |
| Durability of Grip | 4 | 3 | 6 | 7 |
| Durability of Rigidity | 4 | 3 | 6 | 7 |
| Heat Radiation Property | 0° C. | 0° C. | −5° C. | −5° C. |

<Feeling of Grip, Feeling of Grounding, Feeling of Rigidity, Steering Stability, Durability of Grip, and Durability of Rigidity>

An automatic motorcycle having the respective tires for automatic motorcycle was allowed to run on a hard road surface, and feeling of grip (gripping force), feeling of grounding, feeling of rigidity, steering stability at the time of slide running, durability of grip, and durability of rigidity were evaluated on a scale of 1 to 10. The greater the numeric value is, the superior performance is.

As a result, as shown in table 2, it was found that the tires for an automatic motorcycle, according to Examples 1 and 2, are identical in terms of the same feeling of grip, feeling of grounding, and controllability at the time of slide running, to the tires for an automatic motorcycle, according to Comparative Examples 1 and 2. In addition, it was found that the tires for an automatic motorcycle, according to Examples 1 and 2, are superior in terms of durability of grip and durability of rigidity, in comparison with the tires for an automatic motorcycle, according to Comparative Examples 1 and 2.

<Heat Radiation Property>

Each tire for an automatic motorcycle was mounted on a testing drum, and after the tire had been rotated for 10 minutes at a speed of 80 km/h under a condition shown in Table 1, while a tire temperature of a tire for an automatic motorcycle, according to Comparative Example 1 was defined as a reference temperature (0 degree), temperature of other tires for an automatic motorcycle were evaluated. The lower a temperature is the superior a heat radiation property is.

As a result, it was found that the tires for an automatic motorcycle, according to Examples 1 and 2 are superior in heat radiation property in comparison with the tires for an automatic motorcycle, according to Comparative Examples 1 and 2.

(4) Functions and Advantageous Effects

In the embodiment, a flat plate-shaped small piece portion 107 is provided at a position including at least a boundary 90 between a land portion 100 and a groove portion 10. According to the embodiment, a running wind that occurred hits the small piece portion 107 with running of an automatic motorcycle, and a turbulent flow occurs at the small piece portion 107. The periphery of the groove portion 10 or the land portion 100 can be thermally radiated due to the turbulent flow that occurred. In addition, since an area with which the running wind comes into contact increases due to the small piece portion 107, the periphery of the groove portion 10 or the land portion 100 can be effectively thermally radiated. Thus, a temperature of the land portion 100 can be reduced while the automatic motorcycle runs, and the lowering of the rigidity of the land portion 100 can be restrained. In this manner, even in a case where a soft rubber is employed for the land portion 100, a deformation quantity of the land portion 100 on a hard road surface can be reduced. Therefore, even if the automatic motorcycle runs on the hard road surface over a predetermined period of time or more, it is possible to effectively restrain the lowering of required performance such as gripping force, feeling of grounding, and steering stability, which is exerted by the lowering of the rigidity of the land portion 100.

In the embodiment, the land portion 100 has at least one pair of small piece portions 107. According to the embodiment, a turbulent flow is likely to occur due to at least one pair of small piece portions 107 and the periphery of the groove portion 10 or the land portion 100 can be thermally radiated effectively due to the turbulent flow that occurred. Since an area with which the running wind comes into contact further increases due to at least one pair of small piece portions 107, the periphery of the groove portion 10 or the land portion 100 can be thermally radiated more effectively. In particular, one pair of small piece portions 107 are made effective by being provided at positions which are opposite to each other with reference to the center of the land portion 100 as seen in a plan view of the tire 1 for an automatic motorcycle.

In the embodiment, the small piece portion 107 has an upper edge 71 and a side edge 75, and a boundary between the upper edge 71 and the side edge 75, i.e., the end part 73 of the upper edge 71 is formed in a curved shape (an R-shape). Accordingly, the end part 73 of the upper edge 71 is unlikely to be damaged (for example, a breakage or a cutoff is unlikely to occur) and the durability of the small piece portion 107 is improved in comparison with a case in which the end part 73 of the upper edge 71 is formed in a right angled shape.

In the embodiment, a height H3 from the groove portion 10 of the small piece portion 107, i.e., a height from a deepest site 11 of the groove portion 10 up to the upper edge 71 is 10% to 40% of a height H4 from the groove portion 10 of the land portion 100. If the height H3 is lower than 10% of the height H4, since a turbulent flow is unlikely to occur due to the small piece portion 107 and the area with which the running wind comes into contact decreases due to the small piece portion 107, the periphery of the groove portion 10 or the land portion 100 cannot be occasionally thermally radiated effectively. On the other hand, if the height H3 is higher than 10% of the height H4, the rigidity of the land portion 100 becomes too high, steering stability or the like may lower, and a mudguard property of discharging the mud or the like having entered the groove portion 10 may lower.

In the embodiment, a maximum length L of the small piece portion 107 taken along the tire circumferential direction TR or the tread widthwise direction TW is 2 mm to 12 mm. If the maximum length L is smaller than 2 mm, since a turbulent flow is unlikely to occur due to the small piece portion 107 and the area with which the running wind comes into contact decreases due to the small piece portion 107, the periphery of the groove portion 10 or the land portion 100 cannot occasionally be thermally radiated effectively. On the other hand, if the maximum length L is greater than 12 mm, the rigidity of the land portion 100 becomes too high, and steering stability or the like may be lowered, and the mudguard property of discharging mud or the like having entered the groove portion 10 may be lowered.

In the embodiment, a thickness T of the small piece portion 107 is 1 mm to 4 mm. If the thickness T is smaller than 1 mm, the small piece portion 107 is likely to be damaged (for example, a breakage or a cutoff is likely to occur), and the durability of the small piece portion 107 may be lowered. On the other hand, if the thickness T is larger than 4 mm, the rigidity of the land portion 100 becomes too high, steering stability or the like may lower, and the mudguard property of discharging the muds or the like having entered the groove portion 10 may lower.

(5) Exemplary Modifications

The abovementioned small piece portion 107 according to the embodiment may be modified as follows. The same constituent element as the abovementioned small piece portion 107 according to the embodiment is designated by the same reference numeral, and different constituent elements are mainly described hereinafter.

(5-1) Exemplary Modification 1

Figure 7:
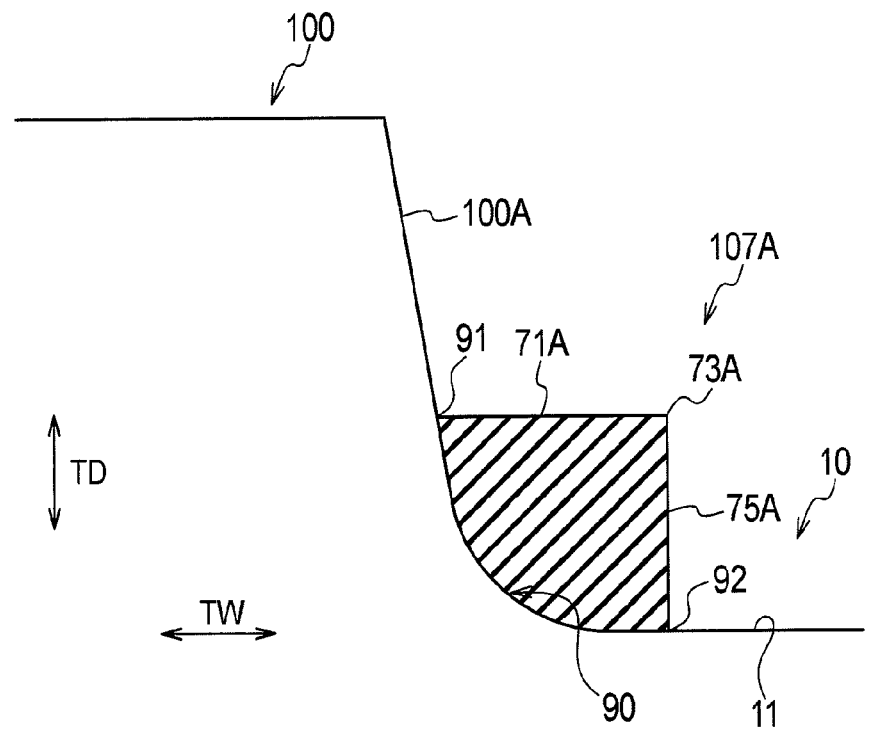
FIG. 7 is a cross-sectional view showing a small piece portion 107A according to Exemplary Modification 1.

First, a structure of a small piece portion 107A according to Exemplary Modification 1 will be described with reference to the drawings. FIG. 7 is a cross-sectional view showing the small piece portion 107A according to Exemplary Modification 1.

An end part 73 of the upper edge 71 in the abovementioned small piece portion 107 according to the embodiment is formed in a curved shape (an R-shape). On the other hand, an end part 73A of an upper edge 71A in the small piece portion 107A according to Exemplary Modification 1 is formed in a right angled shape.

Specifically, as shown in FIG. 7, the small piece portion 107A has: an upper edge 71A which is extensive from a side wall 100A of the land portion 100 along the tread widthwise direction TW; and a side wall 75A which is extensive from the end part 73A of the upper edge 71A that is positioned at a far side from the side wall 100A of the land portion 100 toward the groove portion 10, in a cross section taken along the tread widthwise direction TW or the tire radial direction TD of the tire 1 for an automatic motorcycle.

The upper edge 71A and the side edge 75A are formed in a linear shape. A boundary 91 between the upper edge 71A and the side wall 100A of the land portion 100 and a boundary 92 between the side edge 75A and the groove portion 10 are formed in a right angled shape and are continuous to each other. In addition, a boundary between the upper edge 71A and the side edge 75A, i.e., the end part 73A of the upper edge 71A is formed in a right angled shape.

(5-2) Exemplary Modification 2

Figure 8:
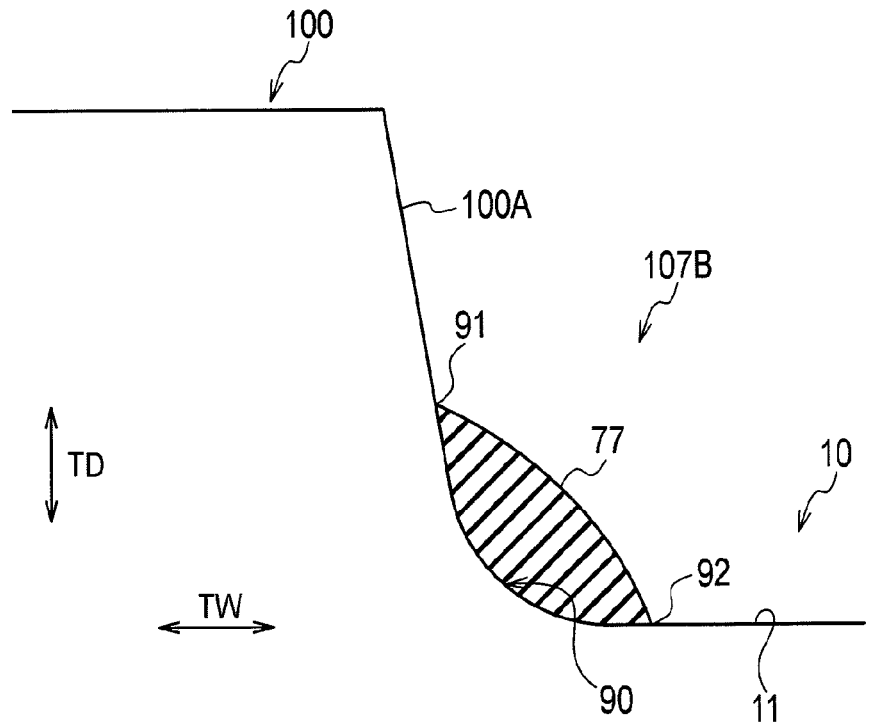
FIG. 8 is a cross-sectional view showing a small piece portion 107B according to Exemplary Modification 2.

Next, a structure of a small piece portion 107B according to Exemplary Modification 2 will be described with reference to the drawings. FIG. 8 is a cross-sectional view showing the small piece portion 107B according to Exemplary Modification 2.

The end part 73 of the upper edge 71 in the abovementioned small piece portion 107 according to the embodiment is formed in a curved shape (an R-shape). On the other hand, the small piece portion 107 according to Exemplary Modification 2 does not have the upper edge 71 and the side edge 75.

Specifically, as shown in FIG. 8, the small piece portion 107A has a curved edge 77 which is curved from the side wall 100A of the land portion 100 toward the groove portion 10 in a cross section taken along the tread widthwise direction TW or the tire radial direction TD of the tire 1 for an automatic motorcycle. A boundary 91 between the curved edge 77 and the side wall 100A of the land portion 100 and a boundary 92 between the curved edge 77 and the groove portion 10 are formed in an acute angled shape and are continuous to each other.

(6) Other Embodiments

As described above, while the contents of the present invention were disclosed through the embodiment of the present invention, it should not be understood that the discussions and drawings forming a part of this disclosure limit the present invention. From this disclosure, a variety of substitutive embodiments, examples, and operational techniques would be self-evident to one skilled in the art.

For example, the embodiment of the present invention can be modified as follows. Specifically, while a tire for an automatic motorcycle was described to be a tire 1 for an automatic motorcycle, the tire may be a tire for a double-wheel vehicle (bicycle) or the like other than the tire 1 for an automatic motorcycle without being limitative thereto.

In addition, while a boundary 90 between the groove portion 10 and the land portion 100 was described to be formed in a curved shape (an R-shape), the boundary may be formed in a substantially right-angled shape, for example, without being limitative thereto.

Further, while a land portion 100 was described as the one that has at least one pair of small piece portions 107, the land portion may have a plurality of small piece portions 107, for example, one, three, or five small piece portions 107, without being limitative thereto. At least one pair of small piece portions 117 do not need to be provided symmetrically in the tire circumferential direction TR or the tread widthwise direction TW with reference to the center of the land portion 100 in a tread planer view, and it is a matter of course that the pair of these portions may be provided asymmetrically.

Furthermore, while the small piece portions 107 were described to be formed in a flat plate shape, these portions may be formed in a wavy plate shape or a zigzag plate shape, for example, without being limitative thereto. The shape, structure, and arrangement of the small piece portions 107 are not be limited in particular, and can be appropriately selected according to their purpose.

As described above, it is a matter of course that the present invention encompasses a variety of embodiments or the like which are not described herein. Therefore, the technical scope of the present invention is defined by only the specific matters of the invention according to the scope of the claims that are reasonable from the foregoing description.

The entire contents of Japanese Patent Application No. 2008-322067 (filed on Dec. 18, 2008) are incorporated in the present specification by way of reference.

INDUSTRIAL APPLICABILITY

As described above, the present invention is applicable in the tire for the motorcycle specialized in the run on the rough ground, since it is cable of effectively restraining lowering of required performance, such as the gripping force, the feeling of grounding, and the steering stability, which is exerted by lowering of the rigidity of a land portion, even if an automatic motorcycle runs on a hard road surface over a predetermined period of time or more, in the tire that the a gripping force (traction performance) is enhanced by cutting the plurality of block-shaped land portions provided at a tread into the rough road surface.

1: tire for motorcycle, 10: groove portion, 11: deepest site, 71,71A: upper edge, 73,73A: end part, 75,75A: side edge, 77: curved edge, 90,91,92: boundary, 100: land portion, 100A: side wall, 100C: center land portion, 100M: intermediate land portion, 100S: end part land portion, 107,107A,107B: small piece portion, 110: first center land portion, 111: shallow groove, 113: recessed portion, 115: protrusion, 117: small piece portion, 120: second center land portion, 123: recessed portion, 125: protrusion, 127: small piece portion, 130: third center land portion, 131: shallow groove, 133: recessed portion, 135: protrusion, 137: small piece portion, 140: fourth center land portion, 141: shallow groove, 143: recessed portion, 145: protrusion, 147: small piece portion, 150: fifth center land portion, 153: recessed portion, 155: protrusion, 157: small piece portion, 175: protrusion, 177: small piece portion, 193: recessed portion, 195: protrusion

The invention claimed is:
1. A tire for a motorcycle, comprising:
a groove portion formed at a tread; and
a block-shaped land portion protrusive from the groove portion toward an outside in a tire radial direction, wherein
the land portion has a plate-shaped small piece portion; and
the small piece portion is provided at a position which includes at least a boundary between the land portion and the groove portion,
wherein a height from the groove portion of the small piece portion is 10% to 40% of a height from the groove portion of the land portion, wherein the land portion comprises a plurality of center land portions, a plurality of end part land portions, and a plurality of intermediate land portions, wherein the center land portions have at least one said small piece portion, and a longitudinal direction of said at least one said small piece portion is taken along the tire circumferential direction, and wherein the intermediate land portions have at least one said small piece portion, and a longitudinal direction of said at least one said small piece portion is taken along the tire circumferential direction.

2. The tire for a motorcycle according to claim 1, wherein the land portion has at least one pair of the small piece portions.

3. The tire for a motorcycle according to claim 2, wherein one pair of the small piece portions are provided at positions which are opposite to each other, with reference to a center of the land portion, seen in a plan view of the tire for a motorcycle.

4. The tire for a motorcycle according to claim 1, wherein the small
piece portion has:
an upper edge which is extensive from the side wall of the land portion along the tire circumferential direction in a cross section taken along the tire circumferential direction and the tire radial direction of the tire for a motorcycle; and
a side edge which is extensive from the end part of the upper edge that is positioned from a far side from the side wall of the land portion toward the groove portion.

5. The tire for a motorcycle according to claim 1, wherein a maximum length of the small piece portion taken along the tire circumferential direction is 2 mm to 12 mm.

6. The tire for a motorcycle according to claim 1, wherein a thickness of the small piece portion is 1 mm to 4 mm.

7. The tire for a motorcycle according to claim 1, wherein the end part land portions have at least one said small piece portion, and a longitudinal direction of said at least one said small piece portion is taken along the tread widthwise direction.

8. The tire for a motorcycle according to claim 7, wherein the small piece portion has:
an upper edge extensive from a side wall of the land portion along the tread widthwise direction in a cross section taken along the tread widthwise direction and the tire radial direction of the tire for a motorcycle; and
a side edge extensive from an end part of the upper edge that is positioned at a far side from the side wall of the land portion toward the groove portion.

9. The tire for a motorcycle according to claim 7, wherein a maximum length of the small piece portion taken along the tread widthwise direction is 2 mm to 12 mm.

* * * * *